United States Patent [19]

Brennan et al.

[11] Patent Number: 5,513,384
[45] Date of Patent: Apr. 30, 1996

[54] SYSTEM AND METHOD FOR PROVIDING MULTIPLE BROADCASTS OF AUDIO INFORMATION TO SPECTATORS

[75] Inventors: Christopher J. Brennan, Winnetka; Terence P. Brennan, Wilmette; Robert C. Phillips, Glencoe; Philip B. Kenny, Glenview; Vladimir Dvorkin, Arlington Heights, all of Ill.

[73] Assignee: Inner Ear Communications, Inc., Winnetka, Ill.

[21] Appl. No.: 149,454

[22] Filed: Nov. 9, 1993

[51] Int. Cl.$^6$ ................................................. H04B 7/00
[52] U.S. Cl. ...................... 455/180.1; 455/66; 455/54.1
[58] Field of Search ......................... 455/42, 59, 180.1, 455/180.2, 188.1, 188.2, 3.2, 3.1, 41, 66, 15, 25, 18, 20, 22, 344, 350, 351, 45, 6.3, 54; 381/74, 79, 80, 82

[56] References Cited

U.S. PATENT DOCUMENTS

| | | | |
|---|---|---|---|
| 2,394,444 | 2/1946 | Halstead | 455/55.1 |
| 2,567,431 | 9/1951 | Halstead | 455/41 |
| 2,710,345 | 6/1955 | Stephens | 455/100 |
| 2,851,537 | 9/1958 | Rosenberg et al. | 381/78 |
| 2,908,766 | 10/1959 | Taylor | 381/79 |
| 3,688,052 | 8/1972 | Self et al. | 381/79 |
| 3,720,788 | 3/1973 | Hashimoto | 381/80 |
| 3,742,359 | 6/1973 | Behymer | 455/66 |
| 3,747,220 | 9/1973 | Abel | 455/42 |
| 3,790,948 | 2/1974 | Ratkovich | 455/66 |
| 3,921,621 | 11/1975 | Baessler | 128/736 |
| 3,924,399 | 12/1975 | Robinson | 368/72 |
| 4,165,487 | 8/1979 | Corderman | 455/41 |
| 4,264,790 | 4/1981 | Zlevor | 381/155 |
| 4,307,466 | 12/1981 | Goldschmidt | 455/57.1 |
| 4,457,019 | 6/1984 | Szabo, Jr. et al. | 455/41 |
| 4,485,484 | 11/1984 | Flanagan | 381/92 |
| 4,551,028 | 11/1985 | Rowen et al. | 368/204 |
| 4,586,195 | 4/1986 | DeGeorge et al. | 381/92 |
| 4,682,155 | 7/1987 | Shirley | 340/545 |
| 4,720,873 | 1/1988 | Goodman et al. | 455/3.2 |
| 4,768,023 | 8/1988 | Xie | 340/573 |
| 5,022,700 | 6/1991 | Fasiska et al. | 296/98 |
| 5,161,250 | 11/1992 | Ianna et al. | 455/66 |
| 5,214,787 | 5/1993 | Karkota, Jr. | 455/45 |
| 5,239,540 | 8/1993 | Rovira et al. | 455/45 |
| 5,428,610 | 6/1995 | Davis | 455/45 |

FOREIGN PATENT DOCUMENTS 2188515  9/1987  United Kingdom ................. 455/54.1

Primary Examiner—Reinhard J. Eisenzopf
Assistant Examiner—Marsha D. Banks-Harold

[57] ABSTRACT

A system and method are disclosed for providing multiple broadcasts of audio information to spectators attending a sporting event. The system comprises radio receivers for picking up broadcasts of local and non-local events, a transmitter and antenna for transmitting the broadcasts within a predetermined frequency range to a limited area surrounding the local event. Radios provided to spectators attending the event are a FM narrow-band receiver for accessing the multiple broadcasts transmitted within the predetermined frequency range.

20 Claims, 1 Drawing Sheet

SYSTEM AND METHOD FOR PROVIDING MULTIPLE BROADCASTS OF AUDIO INFORMATION TO SPECTATORS

BACKGROUND AND SUMMARY

This invention relates to a method and system for providing multiple broadcasts of audio information to spectators at the site of an event such as a sporting contest, horserace, or the like. More particularly, this invention relates to a system and method for providing spectators at an event with broadcasts of audio information regarding the event which they are attending as well as other non-local events.

At many sporting events, such as football games, golf tournaments, car races, etc., and other events at which spectators are present, such as convention centers, financial firms, markets and exchanges, schools, auditoriums, museums, and zoos, etc., it would be very beneficial for spectators to have access to an audio program which would greatly enhance their education and enjoyment of the event. Such an audio program would also be appreciated by spectators during lengthy intervals at the event such as quarter or half time breaks, commercial breaks, intervals between races, etc. However, an audio program regarding only the local event may bore the spectators as such programs may be somewhat repetitious and may include time filling segments of relatively little interest to spectators attending the event. Providing spectators with access to audio broadcasts regarding other sporting events would therefore be welcome entertainment to spectators during such intervals. For example, a spectator attending a track event at the Olympics would appreciate, during the sometimes lengthy intervals between races, having access to audio broadcasts concerning other simultaneously occurring events such as swimming, horseback riding, or gymnastics. Such access to multiple broadcasts would also be beneficial to spectators who are watching an event at one side of a field and wish to learn what is occurring at another event at the other end of the field when loud cheers or other commotion occurs.

Providing spectators with access to multiple audio broadcasts would also be beneficial for events at which the spectators speak different languages. For example, at a football game, one channel could carry a narrative broadcast of the game in English while another channel could carry the broadcast in Spanish. Such a system would be particularly beneficial at events like the Olympics where the spectators speak many languages and broadcasts could be provided in, for example, English, Spanish, Italian, and French.

Current systems for providing spectators at events with audio information generally consist of providing spectators with rented radios or receivers for picking up a locally transmitted signal which carries an audio program regarding the local event. Examples of such systems are disclosed in U.S. Pat. Nos. 3,688,052 and 4,165,587 which generally describe auditoriums equipped with a loop or strip antenna to provide an audio program regarding the event to spectators having a rented radio or receiver. Another example is disclosed in U.S. Pat. No. 5,161,250 which describes a radio device for allowing spectators to receive a local broadcast of the sporting event which they are attending. This device is rendered useless after the termination of the event to ensure that the rented receiver is returned. While these devices inform spectators about the local event as it occurs, it would be beneficial and greatly enhance the spectators' education and enjoyment while attending the event if the spectators were provided with access to broadcasts concerning other non-local sporting events.

Although providing spectators with access to multiple broadcasts of local and non-local events would be very beneficial, providing each spectator at an event with radios for picking up signals from radio stations that broadcast such events, and possibly with receivers for picking up televised broadcasts, would be unduly expensive and practically impossible. Even if the spectators were provided with radios for receiving broadcasts transmitted from commercial radio stations, the selection of broadcasts would be limited to only receiving signals from local radio stations. The reception by such radios would also be susceptible to varying conditions such as weather which may significantly affect the clarity and quality of the broadcast. This is of special concern as one of the more advantageous uses of providing radios to spectators is that the radios allow the hearing impaired to enjoy the sport announcer's broadcast which is usually provided over a public address system and is often difficult to hear.

An important aspect of this invention therefore lies in the recognition that providing multiple broadcasts of audio information to spectators regarding local and non-local events would be very beneficial, and the further recognition that providing spectators with conventional radios, and possibly with receivers for picking up televised events, would be unduly expensive and would only provide spectators with a limited selection of audio broadcasts. In brief, the present invention involves the discovery of an inexpensive and efficient system that provides spectators with access to audio broadcasts regarding the local event and access to a wide selection of commercially available broadcasts regarding other non-local sporting events. The system comprises a receiving means for receiving multiple broadcasts of audio information regarding local and non-local events. Such a receiving means may take the form of a local receiver for receiving local broadcasts such as a sport announcer's narration of the event and a non-local receiver that may take the form of a satellite dish or telephone lines for receiving broadcasts regarding other non-local sporting events. A transmission and antenna means are provided to retransmit the local and non-local broadcasts within a predetermined frequency range to a limited area surrounding the local event. Spectators are then provided with radio devices that include narrow-band receiving means for receiving signals within the predetermined frequency range. Preferably, the predetermined frequency range lies outside of the standard FM radio bands and a preferred frequency range lies within the television VHF frequency range of 50 megahertz to 150 megahertz. The band-width of such a predetermined frequency range preferably occupies a very narrow range of 3 to 6 megahertz as the Federal Communications Commission regulates the availability of frequency ranges and only narrow frequency ranges are typically available. The present invention is therefore efficient and economical in that it provides spectators with numerous broadcasts of audio information while only a narrow frequency range needs to be obtained from the Federal Communications Commission or other like regulatory agency. To organize the multiple broadcasts of audio information, the radio device can include a channel selector means for dividing the predetermined frequency range into a plurality of sub-ranges, each sub-range having a channel designation. Once the radio device is set to one of the sub-ranges or channels, it can be tuned to receive one of the broadcasts within the selected channel. Such a system can preferably provide spectators with a selection of 2 to 40 broadcasts regarding the local event as well as non-local sporting events.

In a preferred embodiment, the predetermined frequency range can be divided into four sub-ranges (or frequency bands) each having a band designation. The transmission and antenna means can then transmit the multiple broadcasts on frequencies such that each band is provided with between 5 and 10 available broadcasts. The band divisions can be used to divide the broadcasts into categories such as by sport, geographic region, or language. For multi-lingual applications, each of the four bands can be assigned a language which would provide spectators with the option of listening to between 5 to 10 different audio programs, each of these programs being available on separate bands in one of the 4 languages.

DETAILED DESCRIPTION OF THE DRAWINGS

DETAILED DESCRIPTION OF PREFERRED EMBODIMENTS

Figure 1:
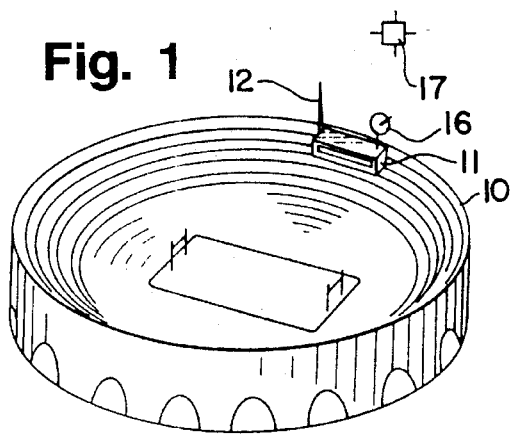
FIG. 1 is a perspective view of a football stadium which is equipped with an antenna for transmitting audio frequency signals and a satellite dish for receiving signals from satellites.

While the system and method of this invention will be discussed in connection with a football event, it will be understood that the system and method of this invention are applicable to situations in which spectators are attending other sporting events, convention centers, financial firms, markets, and exchanges, schools, auditoriums, museums, zoos, etc. Referring to FIG. 1, a football stadium 10 includes a press box 11. An antenna 12 is mounted on the press box above the seating area of the stadium, and signals which radiate from the antenna reach the entire seating area. Preferably, signals transmitted from the antenna are of very low power, for example, of the order of ¼ to ½ watts, so that the signals do not travel an excessive distance beyond the stadium. The frequency range of the signals is preferably within the VHF television range of 50 megahertz to 150 megahertz. Such signals will not interfere with television transmissions because the power of television signals is much higher. Exact frequency ranges of such signals should be determined by available frequencies in the area in accordance with the regulations of the Federal Communications Commission.

Figure 2:
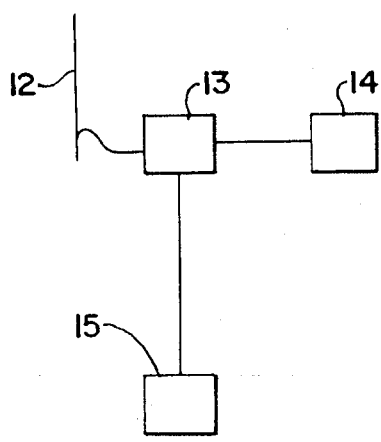
FIG. 2 is a schematic view of the antenna, a transmitting means, and both a local and non-local receiver.

Referring to FIG. 2, antenna 12 is connected to a transmission means 13 for transmitting audio frequency signals through the antenna. Such a set-up is conventional and need not be described further herein. A receiving means is provided for receiving multiple broadcasts of audio information regarding local and non-local events. In one embodiment, the receiving means may take the form of a local receiving means 14 and a non-local receiving means 15, each being connected to transmission means 13. Local receiving means 14 is adapted for receiving broadcasts regarding the local event such as an announcer's narration of the event received through a microphone and other well known electronics. Other broadcasts regarding the local event may include multi-lingual translations of the announcer's narration, locally occurring interviews with participants in the event, or conversations picked up from the event field through a sensitive directional microphone or the like. Non-local receiving means 15 is adapted to receive audio frequency signals carrying broadcasts regarding non-local events and may take the form of a satellite dish 16 mounted upon press box 11 (see FIG. 1). Such satellite dishes are well known and can receive signals from orbiting satellites, such as satellite 17, which commonly relay commercial broadcasts regarding sporting events. Non-local receiving means 15 may also take the form of telephone or cable lines (not shown) which carry broadcasts regarding sporting events or the like.

Transmission means 13 receives the local and non-local broadcasts from the receiving means and transmits the broadcasts on VHF frequency within a narrow predetermined frequency range through antenna 12. Such a predetermined frequency range preferably falls within the VHF television range of 50 to 150 megahertz and preferably occupies a band of approximately 3 to 6 megahertz. The actual frequency band, channels allocation and maximum RF power and frequency deviation are assigned by the Federal Communications Commission and availability of such frequency bands is very limited. Transmitting 2 to 40 broadcasts through such a narrow frequency range therefore provides the spectators with a wide selection of audio programs while only requiring that a narrow frequency range be obtained from the Federal Communications Commission or other like regulatory agency.

Broadcasts transmitted within the narrow predetermined frequency band can be readily accessed with a narrow-band FM radio receiver. Transmission of the multiple broadcasts through the local antenna to a local narrow-band receiver ensures that each of the broadcasts will be carried by a strong enough signal and the clarity and quality of the output will be highly satisfactory to spectators. It is believed that such a system is particularly effective for providing broadcasts to the hearing impaired as the quality and clarity of the sound will meet current standards for providing sound to the hearing impaired.

Figure 3:
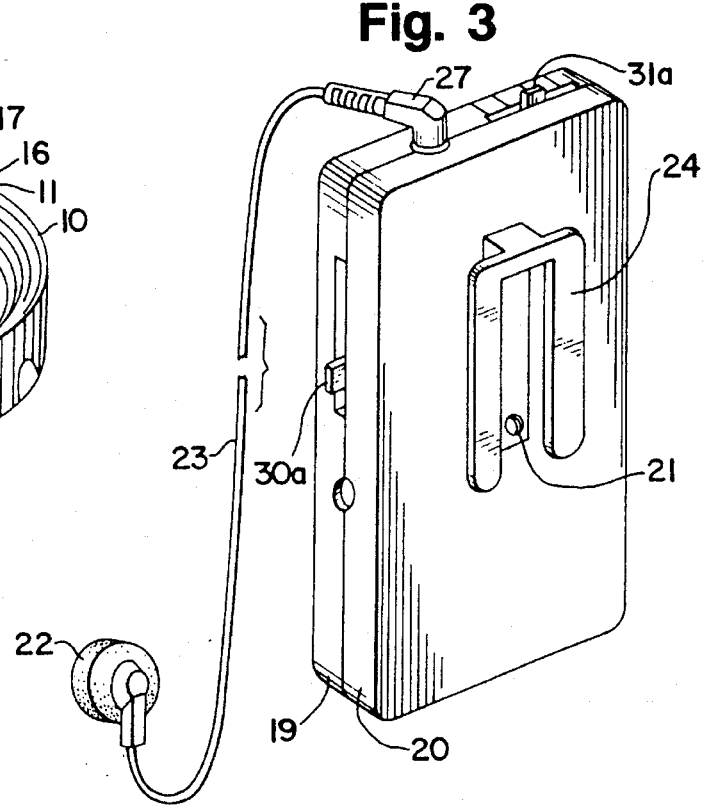
FIG. 3 is a perspective view of a radio device for receiving multiple broadcasts of audio information from the antenna.
Figure 4:
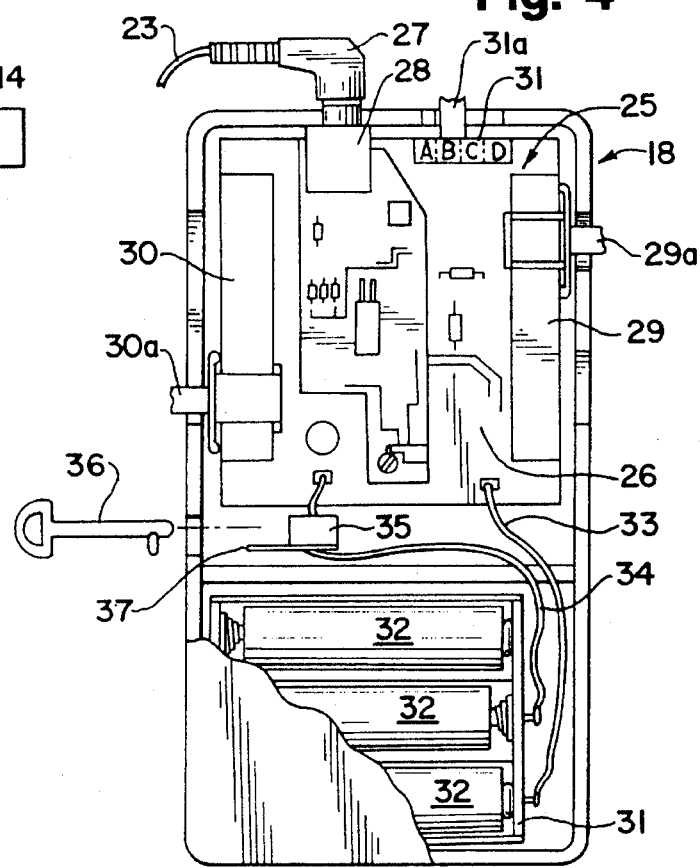
FIG. 4 is a fragmentary cross-sectional view of the radio device, schematically illustrating its internal components.

Such a narrow-band FM receiver can be embodied in a portable radio means which is sold or preferably rented to spectators attending the event. FIGS. 3 and 4 depict a preferred embodiment of such a radio means shown as portable radio 18. Radio 18 includes a front and back panel 19 and 20 that are secured together by a screw 21, and the panels can be easily separated to allow access to the circuitry and power source contained therein. A speaker means is provided for outputting the signals received by radio 18 as sound and is shown as an earphone 22 connected to radio 18 by a wire 23. Radio 18 includes a clip 24 for attaching the radio to a belt or garment worn by a spectator and wire 23 should have a sufficient length to allow the spectator to place earphone 22 in his or her ear. Such an arrangement is conventional and allows for easy use of the device without clumsiness or distraction.

Radio 18 includes an interior 25 which has a narrow-band receiving means disposed therein and shown as a circuit board at 26. Such a narrow-band receiving means is conventional in the art and need not be described in detail herein. Whether the narrow-band receiving means is commercially obtained or specifically manufactured for use in the radio, it is preferable that the receiver be pre-set to be capable of only receiving signals transmitted within the predetermined frequency band used by the transmission and antenna means.

Narrow-band receiver 26 is connected to wire 23 by a conventional plug 27 and jack 28 for outputting a selected broadcast to earphone 22. A conventional volume control means is provided for adjusting the volume of sound output by earphone 22 and may take the form of a slide (or rotary) potentiometer 29 having an adjustment knob 29a.

A tuning means is provided for adjusting narrow-band receiver 26 to select one of the signals transmitted by antenna 12. Such a tuning means may take the form of a slide (or rotary) potentiometer 30 which is conventional and can be adjusted by moving knob 30a, as is well known.

Providing spectators with such multiple broadcasts may be overwhelming at times due to the large numbers of broadcasts which may be in several languages. To organize such a wide variety of available broadcasts, it is beneficial to provide a band selector means on the narrow-band receiver for dividing the predetermined frequency range into a plurality of sub-bands. FIG. 4 illustrates a band selector 31 having four positions and band designations, A, B, C, and D, which each correspond to a sub-band within the predetermined frequency band. A spectator can limit the narrow-band receiver to reception of signals within a specific sub-band by moving knob 31a to select one of the channels. The transmission and antenna means can then be designed to transmit broadcasts of different types to each channel for easy selection by the spectators.

Uses of channel selector means 31 are virtually unlimited and only a few variations are described herein. For example, broadcasts transmitted to each of the bands may relate to a specific sport such as band A being designated for football, band B being designated for baseball, band C being designated for soccer, and band D being designated for hockey. The band selector may also be used to separate broadcasts by geographic area or by University or College affiliation. One of the more advantageous uses of channel selector 31 may take the form of designating each channel for receiving broadcasts in different languages. For example, band A may be designated to receive five different audio programs in English while each of the other channels receive the same five audio programs but each in a different language. In a preferred form, the predetermined frequency band is divided into four sub-bands each having a channel designation, and the transmission and antenna means transmit between 5 and 10 broadcasts to each of the bands for a total of between 20 and 40 available broadcasts.

Radio 18 is provided with a power source means which may take the form of a battery pack 31 having a plurality of batteries 32 contained therein. Power source 31 is connected to receiver 26 by positive and negative lead lines 33 and 34. Since the radios are normally distributed to spectators on a rental or lease basis, it is preferable if the radio includes means for limiting the useful time of the radio to encourage spectators to return the devices. One embodiment of such a play limiting means may take the form of a timer 35 attached to one of the leads connecting the power source to the receiver. Such a timer 35 is conventional and may be of the type that are commonly used in conventional alarm clocks. Timer 35 can be pre-set to allow the radio to be used for a limited time period of, for example, 3 to 5 hours, depending upon the length of the sporting event at which it is distributed. Once the preselected time period has elapsed, the timer 35 can break the connection between the power source and the receiver to render the radio inoperable. When the radio is redistributed, the distributor can use a special key 36 specifically designed to engage a switching means 37 to reset the timer and allow reuse of the radio for the preselected time period.

While in the foregoing, embodiments of the invention have been disclosed in considerable detail for purposes of illustration, it will be understood by those skilled in the art that many of these details may be varied without departing from the spirit and scope of the invention.

We claim:

1. A system for providing individual spectators at a local event with multiple broadcasts of audio information, said system comprising:

receiving means for receiving multiple broadcasts of audio information;

transmission and antenna means for simultaneously transmitting said multiple broadcasts on audio frequency signals within a predetermined frequency range which occupies a bandwidth of approximately 3 to 6 megahertz to a limited area surrounding a local event; and radio means provided to spectators at said local event for providing said spectators with access to a selected one of said multiple broadcasts, said radio means including a narrow-band receiving means for receiving signals within said predetermined frequency range, tuning means for selecting one of said multiple broadcasts, and speaker means for providing said selected one of said multiple broadcasts as sound to said spectator.

2. The system of claim 1 in which said multiple broadcasts include at least one audio broadcast regarding said local event and at least one audio broadcast regarding a non-local event.

3. The system of claim 1 in which said multiple broadcasts include at least one audio program that is simultaneously transmitted as a plurality of broadcasts each in a different language.

4. The system of claim 1 in which said transmission and antenna means transmit 2 to 40 broadcasts on audio frequency signals within said predetermined frequency range.

5. The system of claim 4 in which said predetermined frequency ranges lies within the television audio VHF frequency range of approximately 50 to 150 megahertz.

6. The system of claim 1 in which said receiving means includes a first reception means for receiving broadcasts of audio information regarding said local event and a second reception means for receiving broadcasts of audio information regarding non-local events.

7. The system of claim 6 in which said second reception means comprises satellite dish means for receiving audio frequency signals from satellites.

8. The system of claim 1 in which said radio means includes band selector means for limiting said narrow-band receiving means to reception of one of a plurality of sub-bands within said predetermined frequency range.

9. The system of claim 8 in which said band selector means includes a band designation for each of said sub-ranges.

10. The system of claim 8 in which said transmission and antenna means transmit 2 to 10 broadcasts on audio frequency signals within each of said sub-bands.

11. The system of claim 1 in which said system further comprises play limiting means for rendering said radio means inoperable after a predetermined amount of time.

12. A method of providing multiple broadcasts of audio information to spectators at a local event, said method comprising the steps of:

obtaining audio frequency signals which carry multiple broadcasts of audio information;

simultaneously transmitting said multiple broadcasts on audio frequency signals within a predetermined frequency range which occupies a band-width of approximately 3 to 6 megahertz to a limited area surrounding a local event; and providing radio means to spectators at said local event for providing said spectators with access to a selected one of said multiple broadcasts, each said radio means including a narrow-band receiving means for receiving signals within said predetermined frequency range, tuning means for selecting one of said broadcasts, and speaker means for providing said broadcasts as sound to the spectator.

13. The method of claim 12 further comprising the step of transmitting through a transmission and antenna means at least one audio broadcast regarding said local event and at least one other audio broadcast regarding a non-local event.

14. The method of claim 12 further comprising the step of transmitting through a transmission and antenna means at least one audio program which is simultaneously transmitted as a plurality of broadcasts each in a different language.

15. The method of claim 12 further comprising the steps of obtaining 2 to 40 broadcasts from said receiver and transmitting said 2 to 40 broadcasts through a transmission and antenna means on a plurality of audio frequency signals within said predetermined frequency range.

16. The method of claim 15 in which said predetermined frequency range lies within a television audio VHF frequency range of approximately 50 to 150 megahertz.

17. The method of claim 12 further comprising the steps of obtaining multiple broadcasts of audio information regarding non-local events from a satellite dish and transmitting said multiple broadcasts through a transmission and antenna means to said area surrounding said event on a plurality of audio frequency signals within said predetermined frequency range.

18. The method of claim 12 further comprising the steps of providing said radio means with channel selector means for limiting said narrow-band receiving means to reception of one of a plurality of sub-ranges within said predetermined frequency range.

19. The method of claim 18 further comprising the step of transmitting through a transmission and antenna means between 5 and 10 broadcasts on audio frequency signals within each of said sub-ranges.

20. The method of claim 12 further comprising the step of providing said radio with a play limiting means for rendering said radio means inoperable after a predetermined amount of time.

\* \* \* \* \*